(12) United States Patent
Syed et al.

(10) Patent No.: US 10,582,419 B2
(45) Date of Patent: Mar. 3, 2020

(54) WIRELESS SPECTRUM USAGE AND LOAD-BALANCING

(71) Applicant: TIME WARNER CABLE ENTERPRISES LLC, Saint Louis, MO (US)

(72) Inventors: Hussain Zaheer Syed, Ashburn, VA (US); Praveen C. Srivistava, Ashburn, VA (US); Rajesh M. Gangadhar, Ashburn, VA (US); Sourabh Gupta, Ashburn, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 362 days.

(21) Appl. No.: 14/337,560

(22) Filed: Jul. 22, 2014

(65) Prior Publication Data

US 2016/0029248 A1    Jan. 28, 2016

(51) Int. Cl.
| | |
|---|---|
| *H04W 28/08* | (2009.01) |
| *H04W 72/04* | (2009.01) |
| *H04W 72/02* | (2009.01) |
| *H04W 48/20* | (2009.01) |

(52) U.S. Cl.
CPC ....... *H04W 28/08* (2013.01); *H04W 72/0486* (2013.01); *H04W 48/20* (2013.01); *H04W 72/02* (2013.01); *H04W 72/042* (2013.01); *H04W 72/0453* (2013.01)

(58) Field of Classification Search
CPC .. H04W 88/08; H04W 48/20; H04W 72/0453
See application file for complete search history.

(56) References Cited

U.S. PATENT DOCUMENTS

| | | | |
|---|---|---|---|
| 2005/0185615 A1* | 8/2005 | Zegelin | H04W 48/20 370/331 |
| 2010/0118830 A1* | 5/2010 | Stephenson | H04L 63/10 370/331 |
| 2012/0034943 A1* | 2/2012 | Matta | H04L 47/10 455/513 |
| 2014/0378179 A1* | 12/2014 | Nagai | H04W 16/14 455/509 |
| 2015/0105121 A1* | 4/2015 | Emmanuel | H04W 28/0215 455/553.1 |
| 2015/0271829 A1* | 9/2015 | Amini | H04W 88/08 370/329 |
| 2017/0013560 A1* | 1/2017 | Ruan | H04W 52/245 |

* cited by examiner

*Primary Examiner* — Jae Y Lee
(74) *Attorney, Agent, or Firm* — Armis IP Law, LLC

(57) ABSTRACT

A mobile communication device generates a respective request (such as a wireless communication) to access a network. An access point supporting communications over multiple carrier frequency bands receives the request from the mobile communication device to establish a wireless connection. A connection manager associated with the access point analyzes current load conditions associated with other mobile communication devices communicating with the access point over the multiple carrier frequency bands. Based at least in part on the current load conditions, the connection manager selects a carrier frequency band from the multiple carrier frequency bands. The connection manager initiates notification to the mobile communication device to connect to the access point using the selected carrier frequency band.

25 Claims, 8 Drawing Sheets

WIRELESS SPECTRUM USAGE AND LOAD-BALANCING

BACKGROUND

Conventional RF (Radio Frequency) technology has been used for many years to connect wireless devices such as phones, laptops, etc., to landline networks and/or other wireless networks. Today, RF technology supports many different types of connection services such as cellular voice and data communications, high-speed data services, etc.

One type of RF technology is known as Wi-Fi™. This more recently implemented short-range wireless technology includes large-scale installation of WiFi™ base stations (access points). In comparison to the conventional long-range cellular network technology, WiFi™ technology supports short-range communications such as 200-300 meters as opposed to 1500 or more meters provided by cellular telephone base stations. In comparison to installation of each cellular telephone tower, installation of a respective WiFi™ base station is substantially less expensive for each so-called hot spot.

Wi-Fi™ technology is defined by specifications from the Institute of Electrical and Electronics Engineers (IEEE) 802.11 standards. In general, Wi-Fi™ technology enables computerized devices such as laptop computers, mobile phones, tablet computers, etc., to wirelessly connect to a corresponding computer network. Via a respective wireless link, computer devices can retrieve data over a network such as the Internet.

Conventional computer devices typically have the ability to identify a presence of WiFi™ access points in a corresponding network environment. For example, according to current Wi-Fi™ technology, and a passive scanning technique, each of the access points in a network environment transmits a beacon signal indicating its presence. The mobile computer devices monitor the region for beacons (i.e., wireless signals as generated by the access points) to determine which, if any, access points are present in the region. The mobile computer device selects a suitable access point amongst the multiple access points to establish a WiFi™ connection. Typically, the mobile computer device selects to the access point producing the strongest received signal at the mobile communication device.

In certain instances, a respective wireless access point supports communications at multiple different carrier frequencies such as at 2.4 GHz (GigaHertz) and 5 GHz. Vendors of mobile communication devices sometimes prefer to configure a respective mobile communication device to communicate over the 5 GHz carrier frequency band regardless of the implications to other connected devices communicating with the access point.

BRIEF DESCRIPTION OF EMBODIMENTS

Conventional techniques of providing access to a network using an access point that supports multiple bands such as 2.4 GHz and 5 GHz carrier frequency bands suffer from deficiencies. For example, as previously discussed, in accordance with vendor or user settings, a respective mobile communication device can be configured to default to selection of the 5 GHz carrier frequency band to communicate with a respective access point. This can result in improper loading of clients using 2.4 GHz and 5 GHz carrier frequency bands. As an example, if all of the mobile communication devices communicate over the 5 GHz carrier frequency band (such as when the 2.4 GHz frequency band is relatively unused), this may result in needless congestion and lost of data packets over the 5 GHz carrier frequency band.

Embodiments herein deviate with respect to conventional techniques. For example, embodiments herein include novel ways of managing connectivity between access points supporting multiple frequency band communications and corresponding mobile communication devices. As further discussed below, a connection manager supports load-balancing amongst the multiple different available carrier frequency bands.

More specifically, in accordance with one embodiment, a wireless network includes one or more access points providing access to a respective network such as the Internet. Assume that an access point receives a request (such as a wireless communication) from a mobile communication device to establish a connection with an access point in a network. Assume further that the access point supports wireless connectivity over multiple carrier frequency bands such as at least a first carrier frequency band (such as around 2.4 GHz) and a second carrier frequency band (such as around 5 GHz).

By way of non-limiting example embodiment, the first carrier frequency band supports substantially longer wireless communication distances between the access point and the mobile communication device than the second carrier frequency band. That is, in one embodiment, the first carrier frequency band can be configured to support a first region of wireless communication coverage with respect to the access point; the second carrier frequency band can be configured to support a second region of wireless coverage with respect to the access point. The second region of wireless coverage resides within and is substantially smaller than the first region of wireless coverage.

Embodiments herein include a connection manager. The connection manager is in communication with one or more access points and can be located in any suitable resource such as an access point, controller resource, etc. As its name suggests, the connection manager manages connectivity of one or more mobile communication devices with a respective one or more access points.

In one embodiment, the connection manager analyzes one or more parameters to determine which of the multiple carrier frequency bands is most suitable for a requesting mobile communication device to establish connectivity with a respective access point. By further way of non-limiting example, the parameters analyzed by the connection manager can include any of one or more parameters such as current loading of other mobile communication devices communicating over each of the first carrier frequency band and the second carrier frequency band, a distance of the requesting mobile communication device to the access point, the access point's measure of signal strength of wireless communications received from the requesting mobile communication device, the mobile communication device's measure of signal strength of wireless communications received from the access point, detection of movement of the requesting mobile communication device from the first region of wireless coverage to the second region of wireless coverage, detection of movement of the requesting mobile communication device from the second region of wireless coverage to the first region of wireless coverage, detection of a rate of movement above a threshold value, etc.

More specifically, in one embodiment, in response to receiving a request from a mobile communication device to establish wireless connectivity, the connection manager analyzes parameters such as current load conditions of other mobile communication devices communicating with a recipient access point over the multiple carrier frequency bands. The connection manager selects a suitable carrier frequency band from the multiple carrier frequency bands based at least in part on the current load conditions.

For example, in one embodiment, if data traffic between the access point and other mobile communication devices over the second carrier frequency band is above a threshold value, the connection manager denies the requesting mobile communication device use of the second carrier frequency band to avoid congestion on the second carrier frequency band. Conversely, if data traffic between the access point and other mobile communication devices over the second carrier frequency band is below a threshold value and there is a sufficient bandwidth in the second carrier frequency band available for use by the mobile communication device, the connection manager may provide the requesting mobile communication device access to the access point using the second carrier frequency band.

As further discussed herein, in addition to availability of bandwidth within a respective carrier frequency band, the connection manager can be configured to consider one or more further parameters such as i) the access point measured received signal strength of the wireless signal (request or other communications) received from the mobile communication device, and/or ii) a distance of the mobile communication device from the access point to determine whether to allow the mobile communication device to communicate with the access point over the second carrier frequency band. In this latter embodiment, if the received signal strength of the request is above a signal strength threshold value and the estimated distance of the mobile communication device with respect to the access point is less than a distance threshold value, the connection manager selects the second carrier frequency band (such as the 5 GHz band) for use by the mobile communication device to establish a connection with the access point. Otherwise, the connection manager selects the first carrier frequency band (such as the 2.4 GHz band) for use by the mobile communication device to establish a connection with the access point.

Subsequent to selecting a carrier frequency band, the access point notifies the mobile communication device to connect to the access point using the selected carrier frequency band.

In accordance with further embodiments, multiple access points in the network may receive the request or other wireless communication transmitted from the mobile communication device. Each of the access points monitors the received communication and forwards information regarding receipt of the request to the connection manager. The connection manager selects an access point from the multiple access points and notifies the mobile communication device to establish a respective wireless connection with the selected access point using the selected carrier frequency band. Thus, the connection manager can make intelligent decisions about load-balancing communication devices amongst multiple access points and multiple available carrier frequency bands.

In accordance with further embodiments, the connection manager can be configured to select a respective carrier frequency band based at least in part on distance. For example, assume that the access point receives a request from a mobile communication device to establish a connection with an access point. As previously discussed, the access point supports wireless communications over multiple carrier frequency bands. The connection manager selects a carrier frequency band from multiple carrier frequency bands based at least in part on an estimated distance of the mobile communication device from the access point. The connection manager can estimate the distance between the access point and the mobile communication device in any suitable manner (such as based on: wireless message round-trip time of communications between the mobile communication device and a respective access point, location information indicating a location of the mobile communication device, etc.). In a similar manner as previously discussed, upon selection of a carrier frequency band by the connection manager, the corresponding access point then notifies the mobile communication device to connect to the access point using the selected carrier frequency band.

In accordance with further embodiments, as previously discussed, the multiple carrier frequency bands can include a first carrier frequency band supporting a first region of wireless communication coverage with respect to the access point and a second carrier frequency band supporting a second region of wireless coverage with respect to the access point. The second region of wireless coverage resides within and is substantially smaller than the first region of wireless coverage. In one embodiment, the process of selecting the carrier frequency band includes comparing the estimated distance with a distance threshold value associated with the second region of wireless coverage. By further way of non-limiting example embodiment, the distance threshold value substantially defines an edge of the second region of wireless coverage. In response to detecting that the estimated distance between the mobile communication device and the recipient access point is less than the distance threshold value (indicating that the mobile communication devices is located in the second region of wireless coverage), the connection manager selects second carrier frequency band for use by the mobile communication device to communicate with the access point. Embodiments herein are useful over conventional techniques. For example, load-balancing amongst multiple carrier frequency bands as described herein based on one or more communication parameters ensures that no single available carrier frequency band becomes overloaded with client data traffic.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device (e.g., computer processing hardware) having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed method, system, computer program product, etc., that supports operations as discussed herein.

One or more embodiments herein include a computer readable storage medium and/or system having instructions stored thereon. The instructions, when executed by computer processor hardware, cause the computer processor hardware to: receive a request from a mobile communication device to establish a connection with an access point in a network, the access point supporting wireless communications over multiple carrier frequency bands, the request received in a wireless communication; analyze current load conditions associated with other mobile communication devices communicating with the access point over the multiple carrier frequency bands; select a carrier frequency band from the multiple carrier frequency bands based at least in part on the current load conditions; and notify the mobile communication device to connect to the access point using the selected carrier frequency band.

One or more embodiments herein include a computer readable storage medium and/or system having instructions stored thereon. The instructions, when executed by computer processor hardware, cause the computer processor hardware to: receive a request from a mobile communication device to establish a connection with an access point in a network, the access point supporting wireless communications over multiple carrier frequency bands; select a carrier frequency band from multiple carrier frequency bands based at least in part on an estimated distance of the mobile communication device from the access point; and notify the mobile communication device to connect to the access point using the selected carrier frequency band.

The ordering of the operations above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for controlling wireless communications in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts optionally can be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
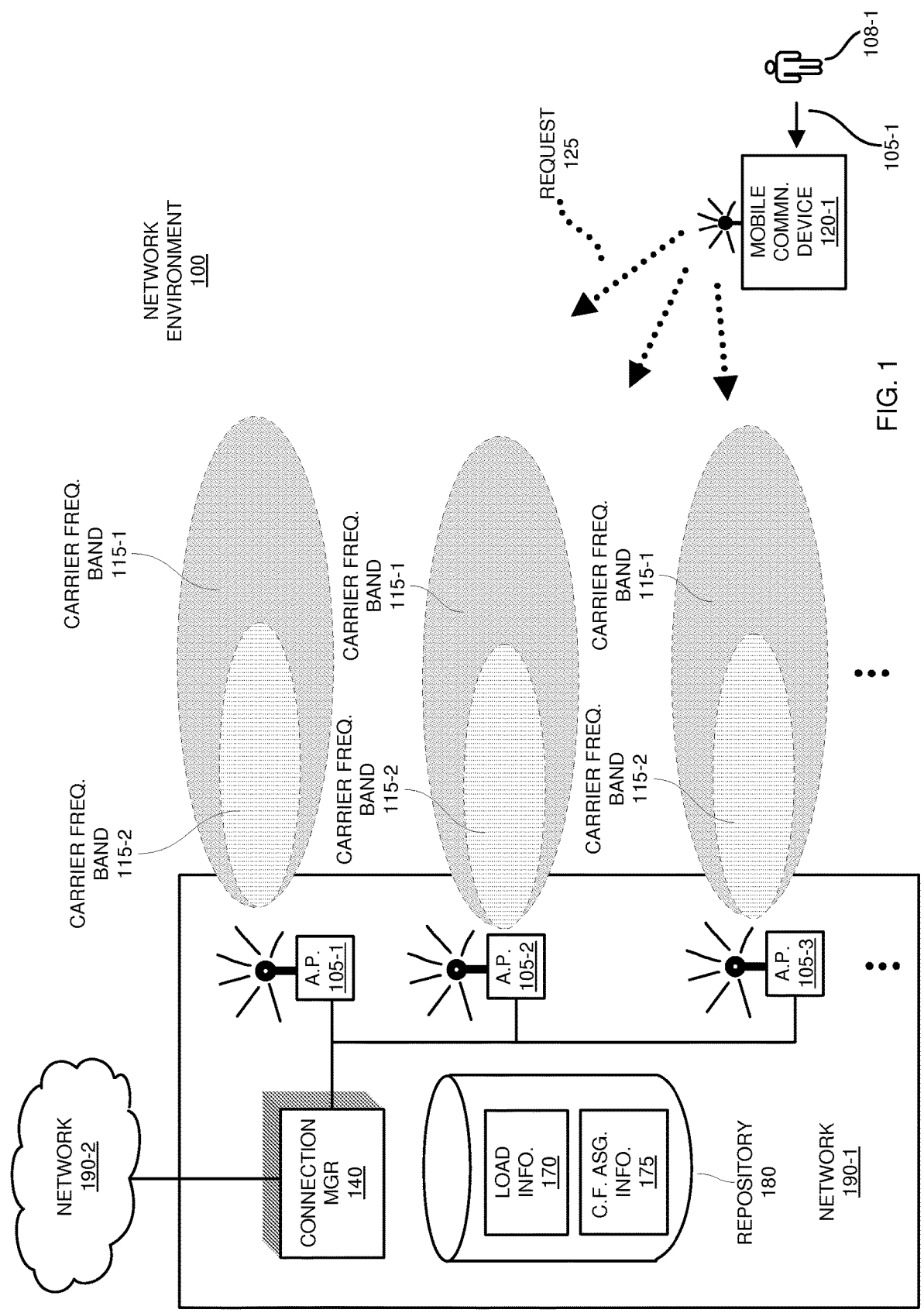
FIG. 1 is an example diagram illustrating load-balancing in a network of access points providing connectivity to a network according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

In accordance with one embodiment, a mobile communication device generates a wireless communication such as a respective request to access a network. An access point supporting communications over multiple carrier frequency bands receives the request. A connection manager associated with the access point analyzes one or more communication parameters to select an appropriate carrier frequency band for use by the requesting mobile communication device. Subsequent to selection of at least one a carrier frequency band, the connection manager initiates communications through the access point to the mobile communication device to notify the mobile communication device to connect to the access point using the selected carrier frequency band.

Now, more specifically, FIG. 1 is an example and illustrating a network environment and load-balancing amongst multiple carrier frequency bands and access points according to embodiments herein.

As shown, network environment 100 includes mobile communication device 120-1. Mobile communication device 120-1 can be one of multiple mobile communication devices operating in network environment 100. Each of the access points 105 in network 190-1 supports any suitable number of mobile communication devices.

As further discussed herein, connection manager 140 provides functions such as: load-balancing amongst access points 105 and the different carrier frequency bands 115, tracking of mobility and current locations of one or more mobile communication devices in network environment 100, controlling establishment of wireless communication links between the respective access point in a corresponding mobile communication device, etc. Note that the connection manager 140 can be disparately located or integrally located with respect to the access points 105.

In this example embodiment, user 108-1 provides input 105-1 to operate mobile communication device 120-1. Via input 105-1, and assuming that the connection manager 140 grants the user 108-1 and corresponding mobile communication device 120-1 access to network 190-2, the user 108-1 can perform different operations such as establish a wireless communication link with a respective access point and communicate through the access point over network 190-2 (such as the Internet) with one or more servers.

Each of the mobile communication devices 120 can be any suitable type of computer device. For example, a respective mobile communication device in network environment 100 can be a cell phone, mobile computer, mobile phone device, digital assistant, a laptop computer, a personal computer, a notebook computer, a netbook computer, a handheld computer, a workstation, etc.

Each mobile communication device is equipped to communicate in a wireless manner with one or more available access points 105. Any of one or more mobile communication devices present in the network environment 100 can be configured to support communications over one or more carrier frequency bands.

The access points 105 and corresponding mobile communication devices can be configured to support any suitable type of wireless communication. In one non-limiting example embodiment, each of the access points 105 supports WiFi™ communications in different frequency bands.

In accordance with further embodiments, note that networks 190 (network 190-1 and network 190-2) can be or include any suitable type of wired or wireless network resources facilitating communications. The networks 190 support client/server communications and delivery of data packets using network addresses assigned to each of the resources.

As further shown, network environment 100 includes connection manager 140. As its name suggests, the connection manager 140 controls wireless connectivity of respective mobile communication device 120-1 with access points 105. In certain instances, the user 108-1 must be a respective subscriber to use any of the access points 105.

Each of the access points 105 supports communications over any suitable number of carrier frequency bands 115. In one embodiment, the multiple carrier frequency bands 115 includes a first carrier frequency band, a second carrier frequency band, a third carrier frequency band, the force carrier frequency band, etc. Each of the carrier frequency bands can support a same or different region of wireless coverage. As an example, the first carrier frequency band can be configured to support a first region of wireless communication coverage with respect to a corresponding access point, the second carrier frequency band can be configured to support a second region of wireless coverage with respect to the corresponding access point, the third carrier frequency band supports a third region of wireless coverage with respect to the corresponding access point; and so on.

In this example embodiment, assume that the access point 105-1 supports communications over carrier frequency band 115-1 (such as a 2.4 GHz carrier frequency band) and carrier frequency band 115-2 (such as 5 GHz carrier frequency band); access point 105-2 supports communications over carrier frequency band 115-1 (such as a 2.4 GHz carrier frequency band) and carrier frequency band 115-2 (such as 5 GHz carrier frequency band); access point 105-3 supports communications over carrier frequency band 115-1 (such as a 2.4 GHz carrier frequency band) and carrier frequency band 115-2 (such as 5 GHz carrier frequency band), and so on.

In accordance with further embodiments, the first carrier frequency band 115-1 supports substantially longer wireless communication distances between a respective access point and the mobile communication device than the second carrier frequency band 115-2. For example, the first carrier frequency band 115-1 can be configured to support a first region of wireless communication coverage with respect to the respective access point; the second carrier frequency band 115-2 can be configured to support a second region of wireless coverage with respect to the respective access point.

Figure 3:
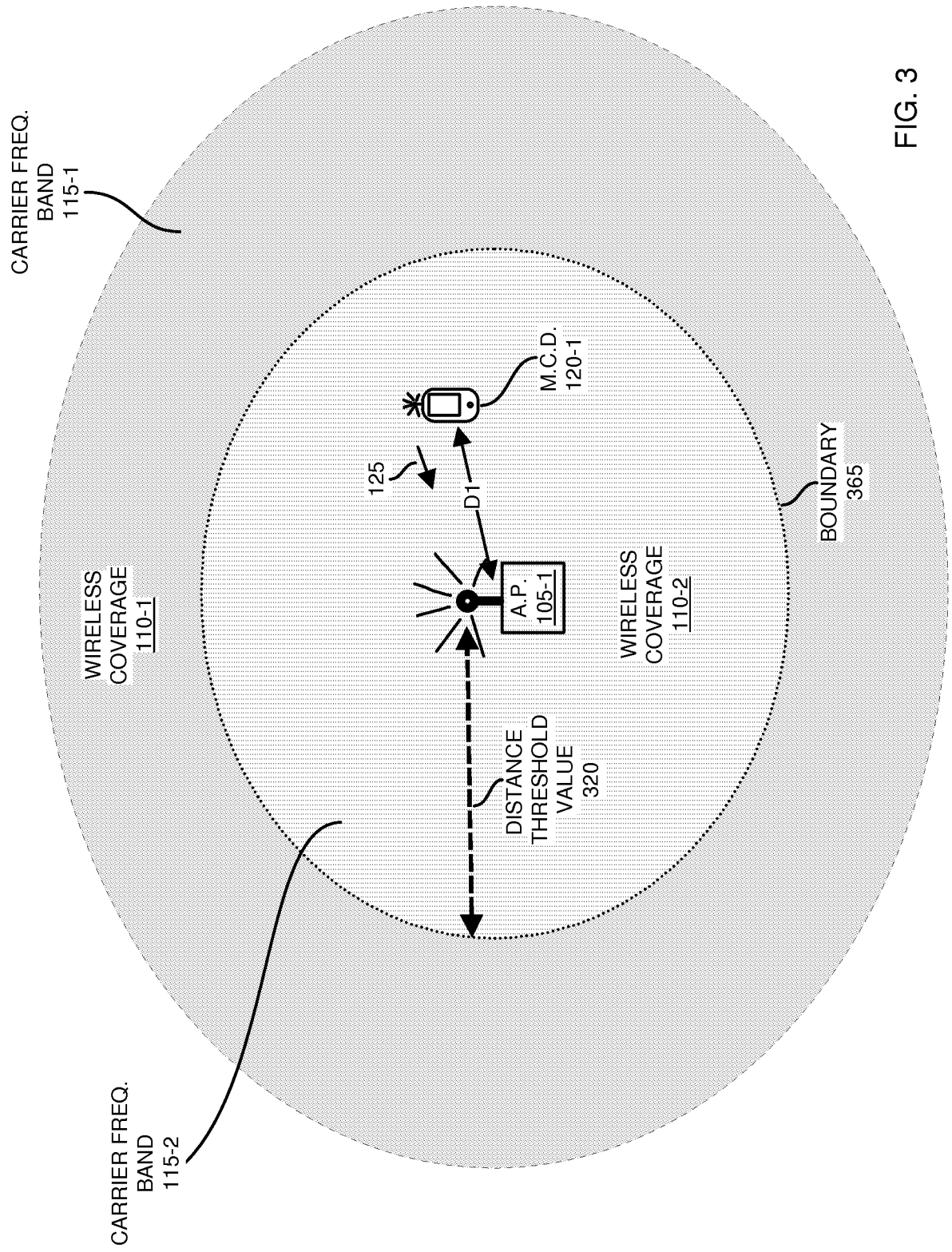
FIG. 3 is an example diagram illustrating wireless coverage provided by multiple different carrier frequency bands according to embodiments herein.
Figure 4:
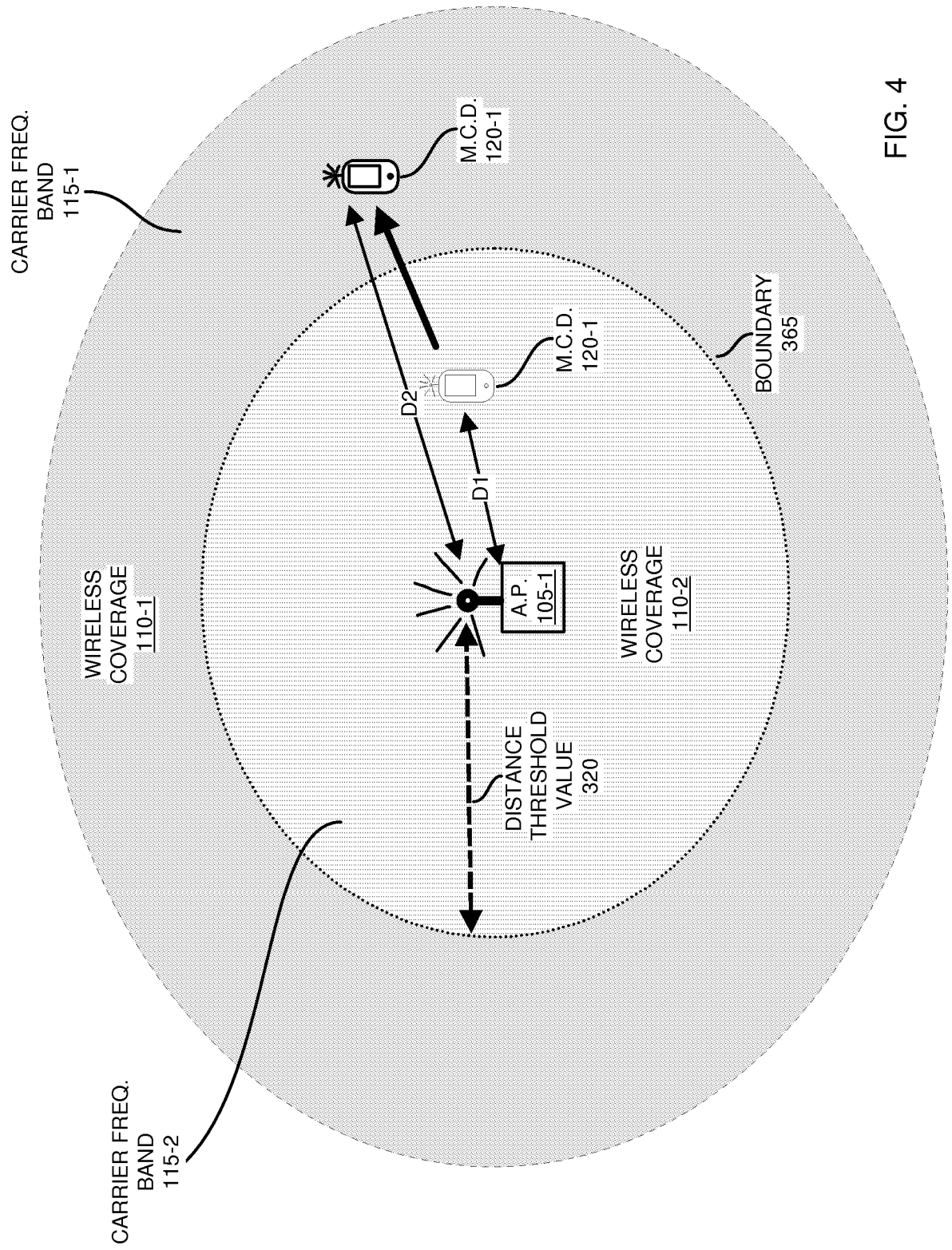
FIG. 4 is an example diagram illustrating switchover of communicating over a second carrier frequency band to communicating over a first carrier frequency band according to embodiments herein.
Figure 5:
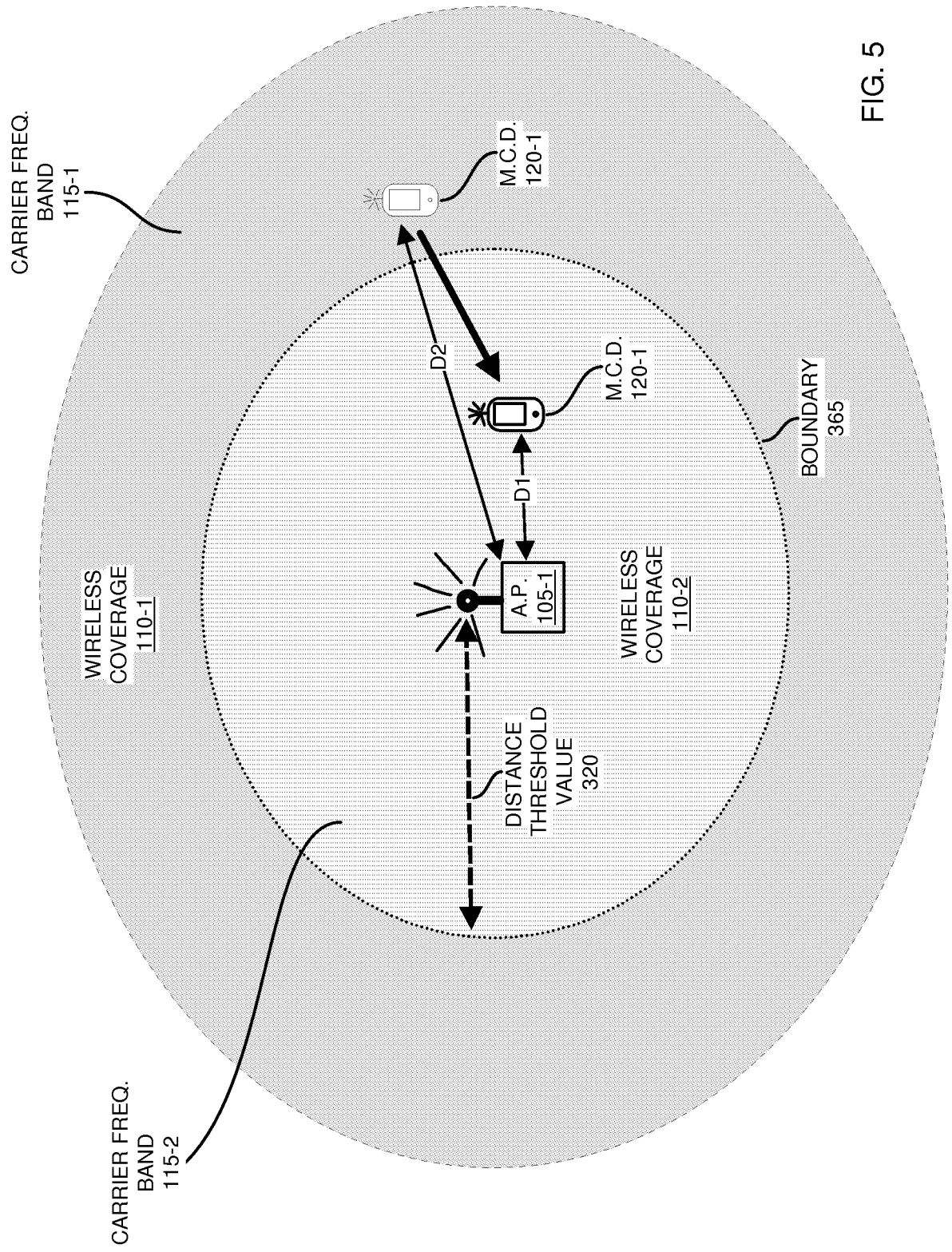
FIG. 5 is an example diagram illustrating switchover of communicating over a first carrier frequency band to communicating over a second carrier frequency band according to embodiments herein.

In one embodiment, as further discussed in subsequent FIGS. 3 through 5, the second region of wireless coverage (as provided by the second carrier frequency band 115-2) resides within and is substantially smaller than the first region of wireless coverage (as provided by the first carrier frequency band 115-1).

Note that, depending on locations of access points 105 in the network environment 100, the respective carrier frequency band regions of wireless coverage as provided by each of the access points can be overlapping or non-overlapping with respect to each other.

Referring again to FIG. 1, embodiments herein provide more efficient use of the different carrier frequency bands 115 and access points 105 depending on one or more communication parameters. For example, embodiments herein can include analyzing one or more parameters to determine which of the multiple carrier frequency bands and/or access point is most suitable for the requesting mobile communication device to establish connectivity with the access point.

As previously discussed, each of the access points supports communications over any suitable number of carrier frequency bands 115 (such as a first carrier frequency band, a second carrier frequency band, a third carrier frequency band, a fourth carrier frequency band, etc.). As further discussed below, one carrier frequency band may be more suitable for supporting communications with a respective mobile communication device 120-1 than another carrier frequency band.

If desired, note that embodiments herein can include assigning priority information to each of the multiple available carrier frequency bands. In such an instance, the manager 140 and/or mobile communication device 120-1 can be configured to select a carrier frequency band from a group of one or more carrier frequency bands assigned a highest priority. As a more specific example, assume that the manager 140 detects that the first carrier frequency band and a third carrier frequency band are more suitable than a second carrier frequency band and a fourth carrier frequency band for establishing a corresponding connection with a mobile communication device 120-1. In such an instance, the manager 140 assigns highest priority to the first carrier frequency band and the third carrier frequency band. The manager 140 assigns lower priority to the remaining carrier frequency bands such as the second carrier frequency band and the fourth carrier frequency band.

To carry out load balancing, in one embodiment, the manager 140 selects amongst the highest priority carrier frequency bands (such as the first carrier frequency band or the third carrier frequency band) in which to establish a communication link between the respective access point and mobile communication device 120-1. The manager 140 can be configured to communicate a message through the corresponding access point and notify the mobile communication device 120-1 of the selected carrier frequency band.

Alternatively, the manager 140 can be configured to communicate priority information to corresponding mobile communication device 120-1. Assume that the manager 140 notifies mobile communication device 120-1 that the first carrier frequency band and the third carrier frequency band are assigned highest priority. The mobile communication device 120-1 can be configured to select amongst the first carrier frequency band and the third carrier frequency band in which to establish a corresponding wireless communication link with a respective access point.

By way of non-limiting example, the communication parameters used to select an appropriate carrier frequency band can include: current loading of other mobile communication devices communicating over each of the first carrier frequency band and the second carrier frequency band, a distance of the requesting mobile communication device to the one or more access points, the access points' measure of signal strength of wireless communications received from the requesting mobile communication device, detection of movement of the requesting mobile communication device from the first region of wireless coverage to the second region of wireless coverage with respect to an access point, detection of movement of the requesting mobile communication device from the second region of wireless coverage to the first region of wireless coverage, etc.

More specifically, in one embodiment, each of the access points generates and transmits one or more corresponding beacons (wireless signals) in network environment 100 to notify corresponding mobile communication devices of their presence. Each beacon can include an identity of the respective access point transmitting the beacon.

As an example, the access point 105-1 periodically transmits a first communication such as a beacon in the first carrier frequency band 115-1 to notify any recipient mobile communication devices that the access point 105-1 supports communications in the first carrier frequency band 115-1; the access point 105-1 periodically transmits a second communication such as a beacon in the second carrier frequency band 115-2 to notify any recipient mobile communication devices that the access point 105-1 supports communications in the second carrier frequency band 115-2. In a similar manner, each of the other access points 105-2, 105-3, etc., can be configured to transmit similar types of beacons to notify the mobile communication devices of the available access points and corresponding supported carrier frequency bands.

Assume that the mobile communication device 120-1 receives a first beacon and a second beacon from the access point 105-1 indicating that the access point 105-1 supports communications over the first carrier frequency band 115-1 and second carrier frequency band 115-2. Assume further that the mobile communication device 120-1 responds to the beacons by generating a request 125 to wirelessly connect to access point 105-1.

In one embodiment, generation of the request 125 can include: i) generating and transmitting a first wireless communication from the mobile communication device 120-1 over the first carrier frequency band 115-1 to the access point 105-1, and/or ii) generating and transmitting a second wireless communication from the mobile communication device 120-1 over the second carrier frequency band 115-2 to the access point 105-2.

As further described herein, the connection manager 140 utilizes one or more communication parameters to determine which of one or more carrier frequency bands the respective mobile communication device 120-1 is allowed to use. For example, embodiments herein can include considering parameters such as: i) current data traffic conditions and availability of bandwidth in each of the carrier frequency bands 115, ii) a received signal strength of the wireless signals (request 125) received from the mobile communication device 120-1, and/or iii) an estimated distance of the mobile communication device 120-1 from the access point 105-1.

Subsequent to selecting a carrier frequency band, the connection manager 140 communicates the selected carrier frequency band to the access point 105-1. The access point 105-1, in turn, communicates a wireless signal to the mobile communication device 120-1 notifying the mobile communication device 120-1 to connect to the access point 105-1 using the selected carrier frequency band.

In accordance with further embodiments, in certain instances, note that the multiple access points in the network environment 100 receive the request 125 from the mobile communication device 120-1. Each of the access points 105 monitors attributes of receiving the request 125 and forwards monitor information regarding the received request 125 to the access control resource 140. The access control resource 140 selects an access point from the multiple candidate access points that receives the request 125 and notifies the mobile communication device to establish a respective wireless connection with the selected access point using a selected carrier frequency band.

Figure 2:
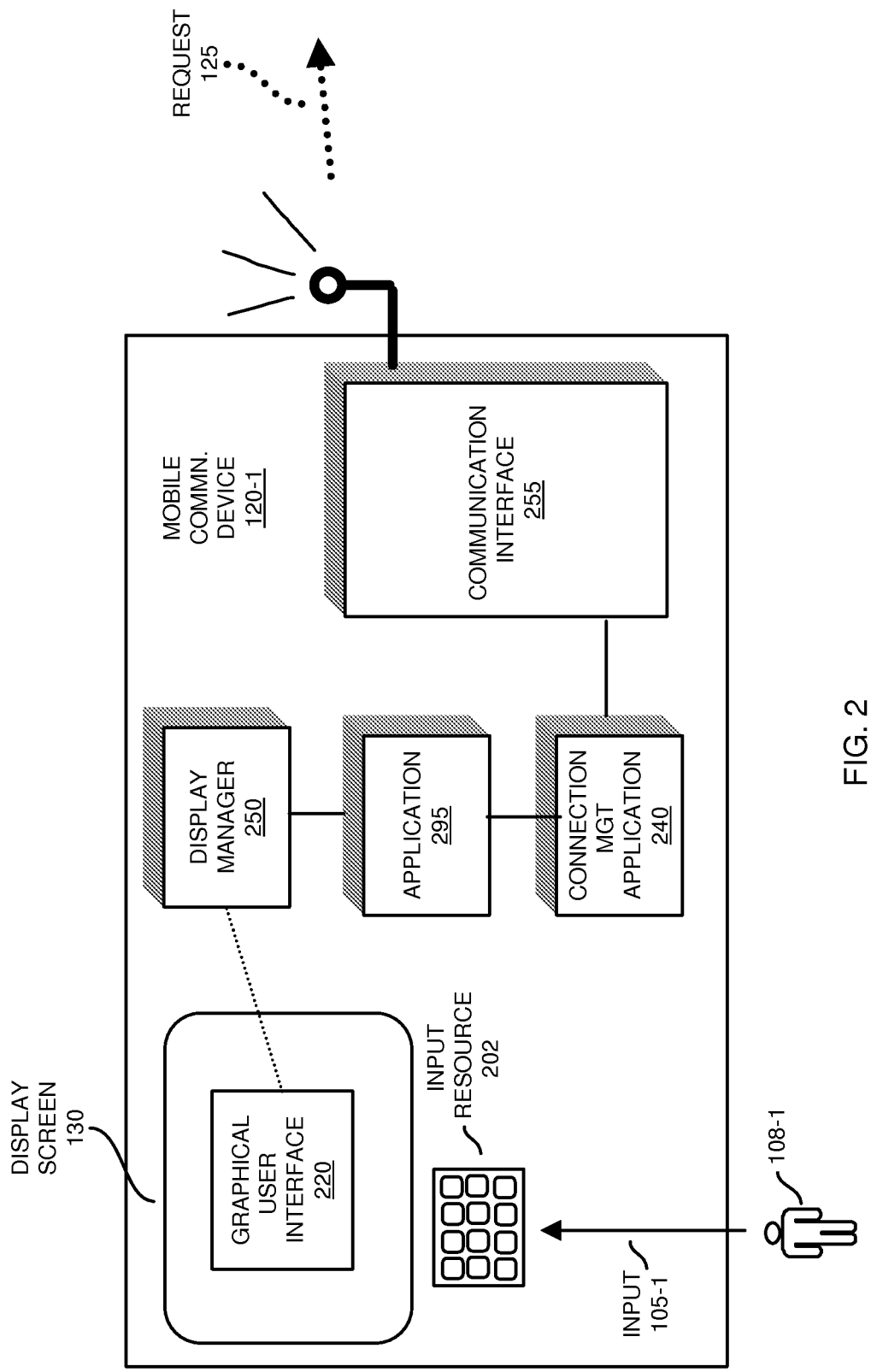
FIG. 2 is an example diagram illustrating a mobile computer device and a corresponding connection management application according to embodiments herein.

FIG. 2 is an example block diagram illustrating functionality associated with a respective mobile communication device according to embodiments herein. Note that mobile communication device 120-1 can include any suitable hardware and software resources to carry out operations as discussed herein.

More specifically, as shown in this example embodiment, mobile communication device 120-1 includes display screen 130, connection management application 240, display manager 250, application 295 (such as a browser application), communication interface 255, etc. Each mobile communication device in network environment 100 can operate in a similar manner and include similar resources, interfaces, applications, etc., as mobile communication device 120-1.

Via input 105-1 to input resource 202 (such as a keyboard, touchscreen, mouse, etc.), assume that the user 108-1 initiates execution of application 295 such as a browser application. In one embodiment, subsequent to execution, the application 295 communicates with connection management application 240 to establish a respective wireless connection with a corresponding access point in network environment 100.

In response to receiving a command from application 295 to establish a network connection, the connection management application 240 (via communication interface 255) attempts to establish a respective wireless communication link with a wireless access point associated in network environment 100. As previously discussed, this can include receiving one or more beacons generated by corresponding access the network environment 100. The mobile communication device 120-1 generates and transmits a corresponding request 125 (such as from communication interface 255) to any of one or more listening access points 105 in network environment 100. In response to generating and transmitting request 125, connection management application 240 of mobile communication device 120-1 receives a wireless response from one or more access points 105. The wireless response indicates which of one or more carrier frequency bands (and possibly one or more specific access points in the network environment 100) that the respective mobile communication device 120-1 can communicate in network environment 100.

In one embodiment, the connection management application 240 receives notification from the connection manager 140 of which particular access point the mobile communication device 120-1 is to establish a respective wireless connection. The connection manager 140 also can specify the particular carrier frequency band to be used. In such an instance, the connection management application 240 establishes a respective connection between the mobile communication device 120-1 and the access point 105-1 in accordance with a particular carrier frequency band selected by the connection manager 140.

Alternatively, the connection manager 140 can notify the connection management application 240 of the different available access points and corresponding available carrier frequency bands. The connection management application 240 can be configured to select amongst available access points in carrier frequency bands to obtain access to network 190-2.

Subsequent to establishing a respective wireless communication link, the application 295 is able to communicate through a respective access point and access network 190-2.

As shown, via display manager 250 in mobile communication device 120-1, the application 295 initiates display of corresponding graphical user interface 220 on display screen 130 of mobile communication device 120-1. Graphical user interface 220 on display screen 130 enables the respective user 108-1 to view information retrieved from server resources in network 190-2.

FIG. 3 is an example diagram illustrating use of communication parameters including current load conditions, signal strength, and/or distance information to select a carrier frequency band according to embodiments herein.

As previously discussed, the first carrier frequency band 115-1 supports substantially longer wireless communication distances between a respective access point 105-1 and the mobile communication device 120-1 than the second carrier frequency band 115-2. For example, the first carrier frequency band 115-1 can be configured to support a first region of wireless communication coverage 110-1 with respect to the respective access point 105-1; the second carrier frequency band 115-2 can be configured to support a second region of wireless coverage 110-2 with respect to the respective access point 105-1.

As shown, the second region of wireless coverage 110-2 (as provided by the second carrier frequency band 115-2) resides within and is substantially smaller than the first region of wireless coverage 110-1 (as provided by the first carrier frequency band 115-1).

In this example, in response to receiving the request 125 from mobile communication device 120-1 to establish wireless connectivity, the connection manager 140 analyzes communication parameters such as current data traffic load conditions of other mobile communication devices in network environment 100 communicating with the access point 105-1 over the multiple carrier frequency bands 115. In other words, as previously discussed, the connection manager 140 has access to load information 170 indicating which of multiple communication devices are in communication with the access point 105-1 as well as carrier frequency assignment information 175 indicating corresponding carrier frequency bands used by each of the mobile communication devices to communicate with the access point 105-1. The load information 170 and/or carrier frequency assignment information 175 can further indicate an amount of current data traffic supported by each of the carrier frequency bands. Accordingly, the connection manager 140 has knowledge of which of the available carrier frequency bands 115, if any, have sufficient available bandwidth to support communications between the mobile communication device 120-1 and access point 105-1.

As previously discussed, the access point 105-1 selects a carrier frequency band from the multiple carrier frequency bands based at least in part on the current data traffic load conditions as specified by the load information 170.

For example, if the amount of data traffic between the access point 105-1 and other mobile communication devices over the second carrier frequency band 115-2 is above a threshold value (indicating that there is not sufficient extra available bandwidth on the second carrier frequency band 115-2 to support communications with the communication device 120-1), in accordance with control information generated by the connection manager 140, the access point 105-1 denies the requesting mobile communication device 120-1 use of the second carrier frequency band 115-2 to communicate with access point 105-1. If desired, denial of use can include, in response to receiving the request 125, generating a communication over the second carrier frequency band 115-2 to the mobile communication device 120-1 indicating that the second carrier frequency band 115-2 is not available to communicate with the access point 105-1. In such an instance, the mobile communication device 120-1 is not able to establish a wireless communication link with the access point 105-1 using the second carrier frequency band 115-2.

Conversely, if current data traffic between the access point 105-1 and other mobile communication devices over the second carrier frequency band 115-2 is below a data traffic load threshold value (indicating that there is sufficient extra available bandwidth on the second carrier frequency band 115-2 to support communications with the communication device 120-1), in accordance with control information received from the connection manager 140, the access point 105-1 transmits a wireless communication to the mobile communication device 120-1 over the second carrier frequency band 115-2 indicating that the second carrier frequency band 115-2 is available to communicate with the access point 105-1. In this latter instance, the mobile communication device 120-1 is able to establish a wireless communication link with the access 105-1 using the second carrier frequency band 115-2.

In accordance with further embodiments, in addition to or as an alternative to using load information 170 to make a decision regarding the use of a respective carrier frequency band, the connection manager 140 can be configured to select a respective carrier frequency band based at least in part on an estimated distance, D1, between the mobile communication device 120-1 and the corresponding access point 105-1. For example, assume that the access point 105-1 receives a request 125 from a mobile communication device 120-1 to establish a wireless connection with access point 105-1 to access network 190-2. As previously discussed, the access point 105-1 supports wireless communications over multiple carrier frequency bands 115. The connection manager 140 associated with the access point 105-1 selects a carrier frequency band from multiple carrier frequency bands 115 based at least in part on an estimated distance of the mobile communication device 120-1 from the access point 105-1. To select a respective carrier frequency band, embodiments herein can include comparing the distance, D1, to a respective distance threshold value. If the distance D1 is greater than a threshold value, the connection manager 140 selects the first carrier frequency band 115-1. If the distance D1 is less than a threshold value, and connection manager 140 can select either the first carrier frequency band 115 or the second carrier frequency band 115-2 depending upon current load conditions. As previously discussed, embodiments herein can include selecting a respective carrier frequency bands such that no carrier frequency band is overloaded.

The access point 105-1 or other suitable resource can estimate the distance between the access point 105-1 and the mobile communication device 120-1 in any suitable manner (such as based on wireless message round-trip time between the mobile communication device 120-1 and the access point 105-1, location information indicating a location of the mobile communication device 120-1 with respect to the access point 105-1, etc.).

Subsequent to selecting a corresponding carrier frequency band, in accordance with the control information provided by the connection manager 140, the access point 105-1 then notifies the mobile communication device 120-1 to wirelessly connect to the access point 105-1 using the selected carrier frequency band.

As previously discussed, the multiple carrier frequency bands 115 can include a first carrier frequency band 115-1 supporting a first region of wireless communication coverage 110-1 with respect to the access point 105-1 and a second carrier frequency band 115-2 supporting a second region of wireless coverage 110-2 with respect to the access point 105-1. The second region of wireless coverage 110-2 resides within and is substantially smaller than the first region of wireless coverage 110-1.

In one embodiment, the process of selecting the appropriate carrier frequency band includes comparing the estimated distance, D1, (between the mobile communication device 120-1 and the access point 105-1) with a distance threshold value associated with the second region of wireless coverage 110-2. In one embodiment, the distance threshold value 320 substantially defines an outer edge (boundary 365) of the second region of wireless coverage 110-2.

In response to detecting a condition such as that the estimated distance, D1, is less than the distance threshold value 320 and that sufficient bandwidth is available to communicate over the second carrier frequency band 115-2, the connection manager 140 selects the second carrier frequency band 115-2 for use by the mobile communication device 120-1 to communicate with the access point 105-1.

Note that the distance threshold value 320 can vary depending upon whether the respective access point is located indoors or outdoors. For example, embodiments herein can include determining a multi-path delay component in meters. The distance threshold value 320 takes into account the multi-path delay complements.

Further embodiments herein can take into account a signal strength (such as based on an RSSI parameter) of the request 125 (or other suitable wireless communication) received (on an uplink) from the mobile communication device 120-1 The access point 105-1 in order to determine an appropriate carrier frequency band on which the respective mobile communication device 120-1 is able to communicate with access point 105-1. More specifically, in addition to or as an alternative to using distance D1 and load information 170, embodiments herein can include comparing the signal strength of a received communication signal such as the request 125 received in the second carrier frequency band 115-2 to a signal strength threshold value. If the signal strength of the received communication (on the second carrier frequency band 115-2) from the mobile communication device 120-1 is not above (below) the signal strength threshold value, the communication manager 140 prevents or denies the mobile communication device 120-1 from using the second carrier frequency band 115-2. Conversely, if the signal strength of the received communication (on the second carrier frequency band 115-2) from the mobile communication device 120-1 is above the signal strength threshold value, the connection manager 140 generates control information indicating that the mobile communication device 120-1 is able to use the second carrier frequency band 115-2 communicate with the access point 105-1. The received signal strength of the communication from the mobile communication device 120-1 on the second carrier frequency band 115-2 may be below a respective signal strength threshold value due to conditions such as interference. In such an instance, the second carrier frequency band 115-2 is likely not a good candidate for use by the mobile communication device 120-1 to communicate with the access point 105-1.

In accordance with further embodiments, the connection manager 140 grants the mobile communication device 120-1 use of the second carrier frequency band 115-2 in response to detecting a number of conditions such as that: i) the signal strength of the communication (such as the request 125 in the second carrier frequency band 115-2) received from the mobile communication device 120-1 is above a respective signal strength threshold value, ii) the distance D1 between the mobile communication device and the access point 105-1 is below a distance threshold value, and iii) that a current load of communications on the second carrier frequency band 115-2 in the region of wireless coverage 110-2 is below a respective load threshold value. If any of these conditions are not met, the connection manager 140 can be configured to select the first carrier frequency band 115-1 (instead of the second carrier frequency band 115-2) for the mobile communication device 120-1 to communicate with the access point 105-1. Selection of the appropriate carrier frequency band can include responding to the request 125 over the first carrier frequency band 115-1 from the access point 105-1 to the mobile communication device 120-1 indicating that the mobile communication device 120-1 is able to use the first carrier frequency band 115-1 to establish the respective wireless communication link with the access point 105-1. Alternatively, selection of the appropriate carrier frequency band can include responding to the request 125 over the second carrier frequency band 115-2 from the access point 105-1 to the mobile communication device 120-1 indicating that the mobile communication device 120-1 is able to use the second carrier frequency band 115-2 to establish the respective wireless communication link with the access point 105-1.

As previously discussed, multiple access points in the network environment may receive the request 125 generated by the mobile communication device 120-1 over one or more carrier frequency bands 115. In such an instance, as mentioned above, the connection manager 140 selects amongst the multiple access points receiving the request 125 and corresponding carrier frequency band is best suited to support communications with the mobile communication device 120-1. Via load information 170, the connection manager 140 determines which of the access points and corresponding frequency bands are available for use by the mobile communication device 120-1. Selecting an appropriate access point in corresponding frequency band for each of multiple mobile computing communication devices present in the network environment 100 ensures that no access points or corresponding carrier frequency bands are overloaded supporting respective mobile communication devices.

As discussed above, the connection manager 140 can be configured to consider any suitable one or more communication parameters (such as a received signal strength of communications, distance D1, frequency band load information, etc.) received from each of the access points (that received the request 125) to select an access point and/or corresponding carrier frequency band.

FIG. 4 is an example diagram illustrating switchover of communicating over a second carrier frequency band to communicating over a first carrier frequency band according to embodiments herein.

In this example embodiment, assume that the mobile communication device 120-1 initially resides at a distance D1 with respect to the access point 105-1. While in wireless coverage 110-2, further assume that the mobile communication device 120-1 communicates with the access point 105-1 over the (selected) second carrier frequency band 115-2.

In one embodiment, via communications between the mobile communication device 120-1 and the access point 105-1, the connection manager 140 monitors a distance between the access point 105-1 and the mobile communication device 120-1. As previously discussed, in one embodiment, the connection manager 140 and/or access point 105-1 monitors a communication parameter such as a round-trip time of communications (such as over the second carrier frequency band 115-2) between the access point 105-1 and the mobile communication device 120-1.

Based on monitoring of distance information and subsequent to communicating between the access point 105-1 and the mobile communication device 120-1 over the second carrier frequency band 150-2, assume that the connection manager 140 detects movement of the mobile communication device 120-1 in a direction outside the second region of wireless coverage 110-2 into the first region of wireless coverage 110-1.

In one embodiment, the connection manager 140 detects movement of the mobile communication device 120-1 out of the second region of wireless coverage 110-2 by comparing a distance between the mobile communication device 120-1 and the access point 105-1 to a distance threshold value 320 defining boundary 365. The connection manager 140 compares this monitored distance (such as D2 in this instance) to a corresponding distance threshold value 320. Responsive to detecting the movement (such as detecting that mobile communication device 120-1 is now a distance D2 from the access point 105-1, which is greater than the corresponding distance threshold value 320) and that the first carrier frequency band 115-1 is not overloaded supporting other devices, via communications through the access point 105-1, the connection manager 140 notifies the mobile communication device 120-1 to terminate communications with the access point 105-1 using the second carrier frequency band 115-2 and continue communications with the access point 105-1 over the first carrier frequency band 115-1. Such a notification may be dependent upon detecting that the first carrier frequency band 115-1 is currently not overloaded.

A transition of communicating with the mobile communication device 120-1 to communicating with the mobile communication device 120-1 over the second carrier frequency band 115-2 can be seamless. For example, in response to receiving notification to terminate communications over the second carrier frequency band 115-2, a mobile communication device 120-1 disassociates with the access point 105-1 only at the MAC layer and reestablishes a respective wireless communication link with the access point 105-1 at the first carrier frequency band 115-1. Thus, a user 108-1 may not even be aware or affected by the transition from communicating over one carrier frequency band and then switching to another carrier frequency band.

In addition to or as an alternative to monitoring the distance of the mobile communication device 120-1 with respect to the access point 105-1, embodiments herein can include detecting movement based on monitoring (at the access point 105-1) an uplink signal strength (such as RSSI or received signal strength indicator) of one or more communication signals (transmitted in the second carrier frequency band 115-2) from the mobile communication device 120-1 to the access point 105-1 and comparing the measured uplink signal strength to a signal strength threshold value. The connection manager 140 can be configured to initiate switchover from the second carrier frequency band 115-2 to the first carrier frequency band 115-1 in response to detecting that the measured uplink signal strength of one or more wireless communication signals from the mobile communication device 120-1 in the second carrier frequency band 115-2 falls below the signal strength threshold value. The decrease of the signal strength of the received signal below the threshold value likely indicates that the mobile communication device 120-1 is moving away from the access point 105-1.

In certain instances, it may be desirable to prevent needless switching between selection of the second carrier frequency band 115-2 and the first carrier frequency band 115-1 when a respective mobile communication device 120-1 resides at boundary 365. To provide hysteresis, the access point 105-1 can be configured to measure the uplink signal strength of wireless communications received from the mobile communication device 120-1 on the second carrier frequency band 115-2 (such as 5 GHz). The mobile communication device 120-1 measures a signal strength of receiving beacons (such as 2.4 GHz) transmitted from the access point 105-1 over the first carrier frequency band 115-1 to the mobile communication device 120-1. The mobile communication device 120-1 forwards the measured signal strength of the 2.4 GHz beacons to the access point 105-1 and connection manager 140. The connection manager 140 produces a metric by subtracting the measured signal strength of the 2.4 GHz beacons from an absolute value of uplink signal strength of wireless communications as measured by the access point 105-1. The connection manager 140 then compares the generated metric to a (predetermined switchover threshold value (comp 5 to 2). In one embodiment, this comparison is used as a factor whether or not to switchover to the 2.4 GHz band. In response to detecting that the metric is greater than a threshold value, the connection manager 140 initiates a transition of the mobile communication device 120-1 from communicating over the second wireless carrier frequency band 115-2 to communicating over the first carrier frequency band 115-1.

In accordance with yet further embodiments, note that the connection manager 140 may initially assign the second carrier frequency band 115-2 to support communications between the mobile communication device 120-1 and access point 105-1 as previously discussed. Subsequent to communicating between the access point 105-1 and the mobile communication device 120-1 over the second carrier frequency band 115-2, the connection manager 140 can be configured to repeatedly measure and analyze a distance of the mobile communication device 120-1 with respect to the access point 105-1. Assume that the distance measurements indicate that a rate of movement of the mobile communication device 120-1 is above a rate threshold value. In such an instance, responsive to detecting that the rate of the movement of the mobile communication device 120-1 is above the rate threshold value, the connection manager 140 can be configured to notify (such as through the access point 105-1) the mobile communication device 120-1 to terminate communications with the access point 105-1 using the second carrier frequency band 115-2 and continue communications with the access point 105-1 over the first carrier frequency band 115-1. The high rate of movement indicates that the candidate mobile communication device 120-1 is better suited to communicate over the first carrier frequency band 115-1 because it covers a wider range.

In accordance with yet further specific embodiments, the connection manager 140 initiates switchover from communicating over the carrier frequency band 115-2 (such as 5 GHz) to communicating over the first carrier frequency band 115-1 (such as 2.4 GHz) in response to detecting three conditions: i) the access point 105-1 measurement of a signal strength of the 5 GHz communication signals from the mobile communication device 120-1 over the second carrier frequency band 115-2 to the access point 105-1 is greater than a 5 GHz signal strength threshold value, and ii) a distance of the mobile communication device 120-1 from the access points 105-1 becomes greater than a distance threshold value 320, and iii) [ABS (access point 105-1 measured uplink signal strength (5 GHz) minus mobile communication device 120-1 measured downlink signal strength of 2.4 GHz beacons from the access point 105-1] is greater than a switchover threshold value (such as comp 5 to 2 dB).

FIG. 5 is an example diagram illustrating switchover of communicating over a first carrier frequency band to communicating over a second carrier frequency band according to embodiments herein.

In this example embodiment, assume that the mobile communication device 120-1 initially resides at a distance D2 with respect to the access point 105-1. While in wireless coverage 110-1, assume that the mobile communication device 120-1 communicates with the access point 105-1 over the (selected) first carrier frequency band 115-1.

In one embodiment, via communications between the mobile communication device 120-1 and the access point 105-1, the connection manager 140 continuously monitors a distance between the access point 105-1 and the mobile communication device 120-1. As previously discussed, in one embodiment, the connection manager 140 monitors a communication parameter such as a round-trip time of communications (such as over the first carrier frequency band 115-1) between the access point 105-1 and the mobile communication device 120-1.

Based on monitoring the distance information and subsequent to communicating between the access point 105-1 and the mobile communication device 120-1 over the carrier frequency band 115-1, assume that the connection manager 140 detects movement of the mobile communication device 120-1 from the first region of wireless coverage 110-1 to inside the second region of wireless coverage 110-2.

In one embodiment, the connection manager 140 detects movement of the mobile communication device 120-1 to inside of the second region of wireless coverage 110-2 by comparing a newly detected distance D1 between the mobile communication device 120-1 in the access point 105-1 to distance threshold value 320. Responsive to detecting the movement (such as detecting that mobile communication device 120-1 is now a distance D1 from the access point 105-1 which is less than the corresponding distance threshold value 320) and that the second wireless carrier frequency band 150-2 is not overloaded supporting other devices, via communications through the access point 105-1, the connection manager 140 notifies the mobile communication device 120-1 to terminate communications with the access point 105-1 using the first carrier frequency band 115-1 and continue communications with the access point 105-1 over the second carrier frequency band 115-2.

In a similar manner as previously discussed, a transition of communicating with the mobile communication device 120-1 to communicating with the mobile communication device 120-1 over the carrier frequency band 115-2 instead of continuing communications of the carrier frequency band 115-1 can be seamless. For example, in response to receiving notification to terminate communications over the first carrier frequency band 115-1, mobile communication device 120-1 disassociates with the access point 105-1 only at the MAC layer and reestablishes a respective wireless communication link with the access point 105-1 at the carrier frequency band 115-2. Thus, a user 108-1 may not even be aware or affected by the transition from communicating over one carrier frequency band and then switching to another carrier frequency band.

In addition to or as an alternative to monitoring the distance of the mobile communication device 120-1 with respect to the access point 105-1, embodiments herein can include detecting movement based on monitoring a downlink signal strength (such as RSSI or received signal strength indicator) of one or more wireless communication signals such as beacons (transmitted in the second carrier frequency band 115-2) from the access point 105-1 to the mobile communication device 120-1. The mobile communication device 120-1 monitors a strength of receiving the signals in the second carrier frequency band 115-2 and produces a downlink signal strength indicator of one or more communications received from the access point 105-1 on the second carrier frequency band 115-2. The magnitude of the downlink signal strength indicator produced by the mobile communication device 120-1 indicates a degree to which the mobile communication device 120-1 is able to receive communications over the second carrier frequency band 115-2 from the access point 105-1.

The mobile communication device 120-1 forwards the generated downlink signal strength indicator value to the access point 105-1 and/or connection manager 140. The connection manager 140 compares the downlink signal strength indicator produced by and received from the mobile communication device 120-1 to a corresponding signal strength threshold value. Using the comparison result as at least a factor in determining whether to initiate carrier frequency band switchover, the connection manager 140 initiates switchover from communicating over the first carrier frequency band 115-1 to communicating over the second carrier frequency band 115-2 based at least in part in response to detecting that the measured downlink signal strength of one or more (5 GHz) wireless signals received by the mobile communication device 120-1 are above the signal strength threshold value. The increase of the downlink signal strength above the threshold value indicates that the mobile communication device 120-1 is moving towards the access point 105-1.

In certain instances, it may be desirable to prevent switching between selection of the second carrier frequency band 115-2 and the first carrier frequency band 115-1 when a respective mobile communication device 120-1 resides at or near boundary 365. To this end, the access point 105-1 can be configured to continuously measure the uplink signal strength of wireless communications received from the mobile communication device 120-1 on the first carrier frequency band 115-1 (such as 2.4 GHz). The mobile communication device 120-1 measures a signal strength of receiving one or more wireless signals (such as at 5 GHz) transmitted from the access point 105-1 over the carrier frequency band 115-2 to the mobile communication device 120-1. The mobile communication device 120-1 forwards the measured signal strength of the downlink measured 5 GHz wireless signals (beacons) to the access point 105-1 and connection manager 140. The connection manager 140 produces a metric by subtracting the access point 105-1 measured signal strength of the 2.4 GHz communications from an absolute value of downlink signal strength of wireless communications (such as 5 GHz wireless communications received from the access point 105-1) as measured by the mobile communication device 120-1. The connection manager 140 then compares the metric to a predetermined switchover threshold value (comp 2 to 5). Based at least in part on detecting that the metric is greater than the switchover threshold value, the connection manager 140 initiates transition from communicating over the wireless carrier frequency band 115-1 to communicating over the carrier frequency band 115-2. As previously discussed, switchover may depend on availability of bandwidth in the second carrier frequency band 115-2 and/or the distance of the mobile communication device 120-1 with respect to the access point 105-1.

In one embodiment, the connection manager 140 initiates switchover from communicating over the carrier frequency band 115-1 (such as 2.4 GHz) to communicating over the second carrier frequency band 115-2 (such as 5 GHz) in response to detecting three conditions: i) the mobile communication device 120-1 measurement of a signal strength of the 5 GHz one or more wireless signals such as beacons over the second carrier frequency band 115-2 from the access point 105-1 is greater than the signal strength threshold value, and ii) a distance of the mobile communication device 120-1 from the access points 105-1 is less than a distance threshold value, and iii) [ABS (communication device 120-1 measured downlink beacon signal strength (5 GHz) minus access point 105-1 measured uplink signal strength of communications received from the mobile communication device] is greater than a switchover threshold value (such as comp 2 to 5 dB).

Figure 6:
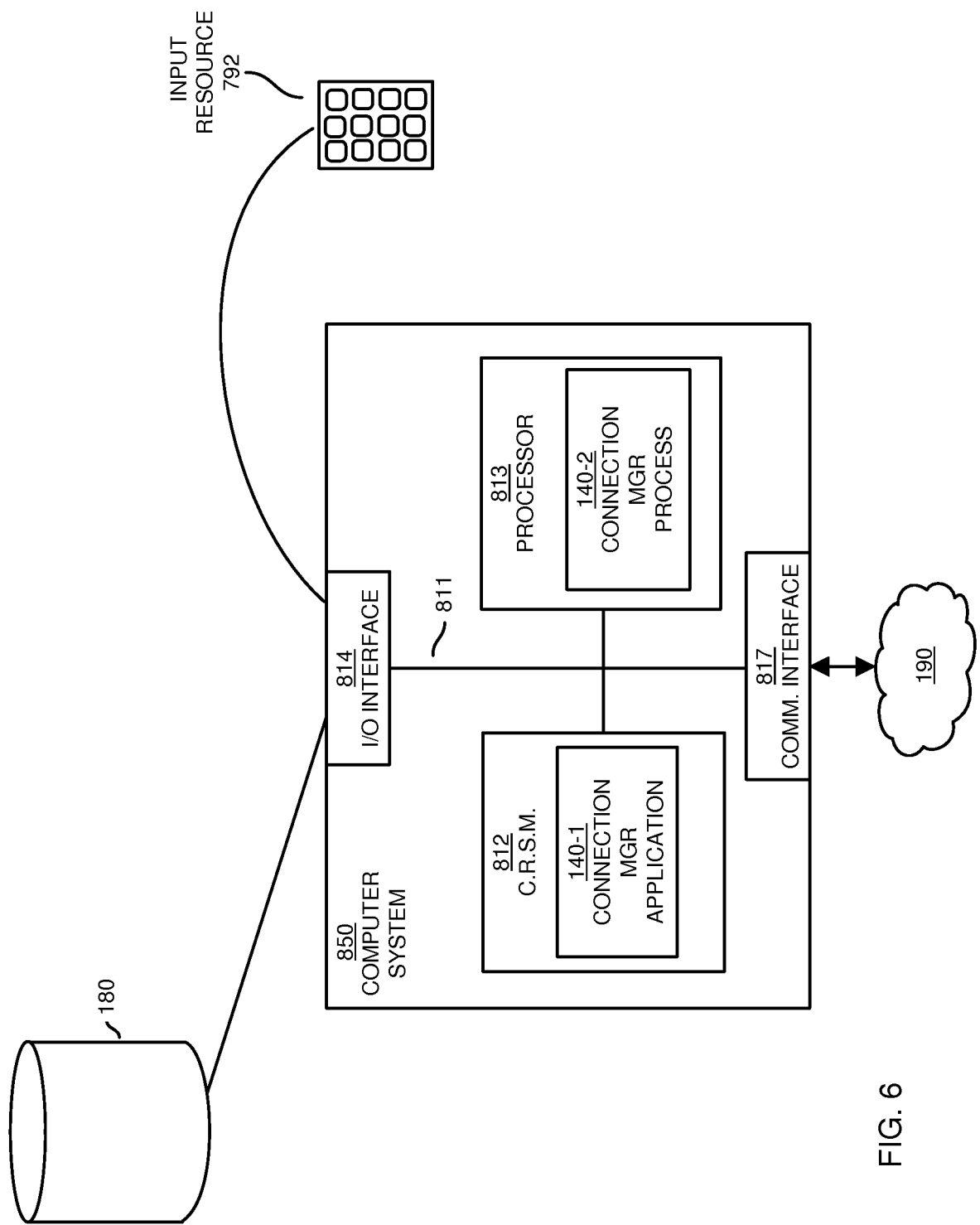
FIG. 6 is a diagram illustrating an example computer architecture in which to execute any of the functionality according to embodiments herein.

FIG. 6 is an example block diagram of a computer device for implementing any of the operations as discussed herein according to embodiments herein.

As shown, computer system 850 of the present example includes an interconnect 811, a processor 813 (such as one or more processor devices, computer processor hardware, etc.), computer readable storage medium 812 (such as hardware storage to store data), I/O interface 814, and communications interface 817. Computer system 850 can execute the operations associated with connection manager 140, mobile communication device 120-1, etc.

Interconnect 811 provides connectivity amongst processor 813 (computer processor hardware), computer readable storage media 812, I/O interface 814, and communication interface 817.

I/O interface 814 provides connectivity to a repository 180 and, if present, other devices such as a playback device, display screen, input resource 792, a computer mouse, etc.

Computer readable storage medium 812 (such as a non-transitory hardware medium) can be any hardware storage resource or device such as memory, optical storage, hard drive, rotating disk, etc. In one embodiment, the computer readable storage medium 812 stores instructions executed by processor 813.

Communications interface 817 enables the computer system 850 and processor 813 to communicate over a resource such as network 190 to retrieve information from remote sources and communicate with other computers. I/O interface 814 enables processor 813 to retrieve and process information stored in repository 180.

As shown, computer readable storage media 812 is encoded with connection manager application 140-1 (e.g., software, firmware, etc.) executed by processor 813. Connection manager application 140-1 can be configured to include instructions to implement any of the operations as discussed herein.

During operation of one embodiment, processor 813 (e.g., computer processor hardware) accesses computer readable storage media 812 via the use of interconnect 811 in order to launch, run, execute, interpret or otherwise perform the instructions in connection manager application 140-1 stored on computer readable storage medium 812.

Execution of the connection manager application 140-1 produces processing functionality such as connection manager process 140-2 in processor 813. In other words, the connection manager process 140-2 associated with processor 813 represents one or more aspects of executing connection manager application 140-1 within or upon the processor 813 in the computer system 850.

Those skilled in the art will understand that the computer system 850 can include other processes and/or software and hardware components, such as an operating system that controls allocation and use of hardware resources to execute connection manager application 140-1.

In accordance with different embodiments, note that computer system may be any of various types of devices, including, but not limited to, a wireless access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 850 may reside at any location or can be included in any suitable resource in network environment 100 to implement functionality as discussed herein.

Functionality supported by the different resources will now be discussed via flowcharts in FIGS. 7 and 8. Note that the steps in the flowcharts below can be executed in any suitable order.

Figure 7:
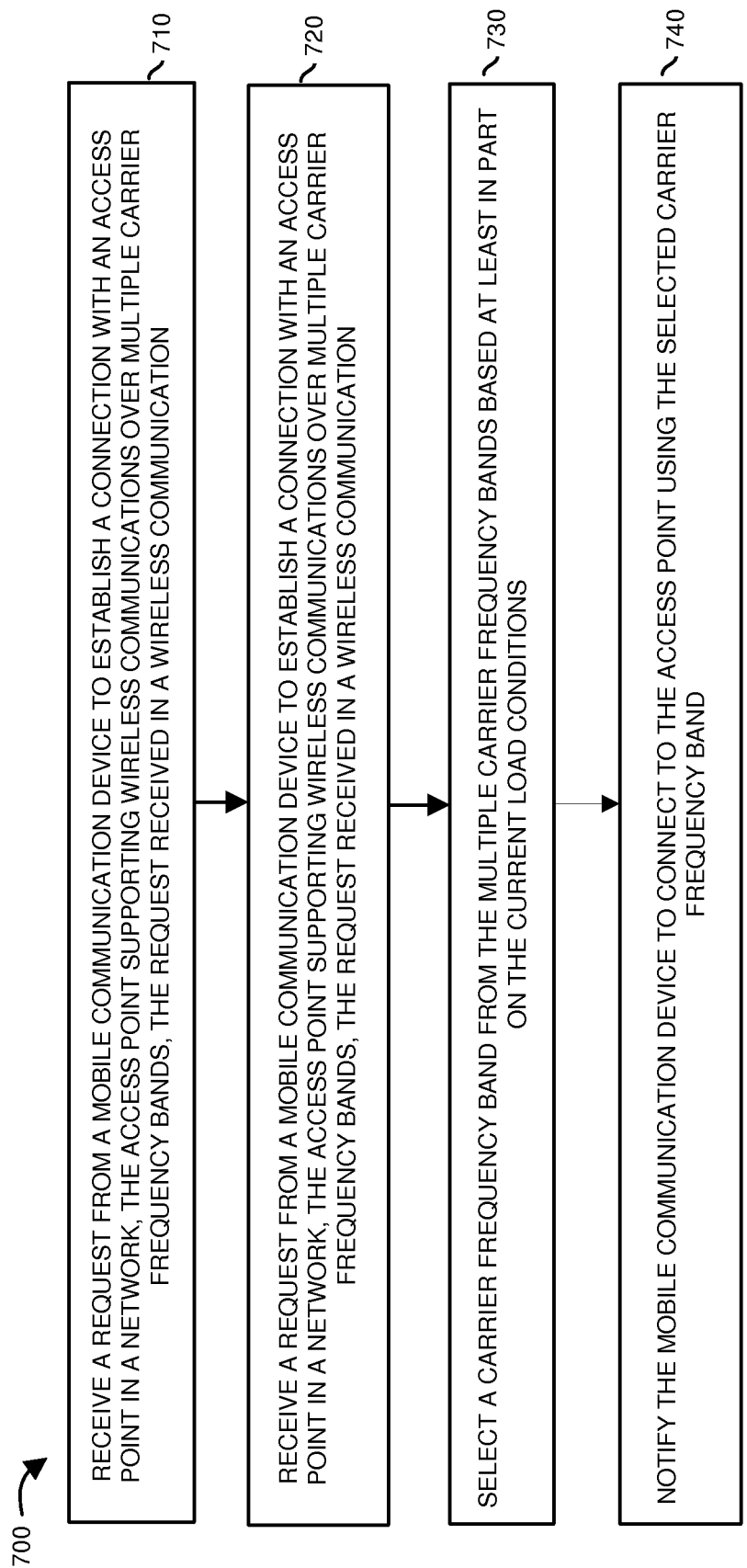
FIGS. 7 and 8 are example diagrams illustrating methods according to embodiments herein.

FIG. 7 is a flowchart 700 illustrating an example method according to embodiments. Note that there will be some overlap with respect to concepts as discussed above.

In processing block 710, the connection manager 140 receives a request from a mobile communication device 120-1 to establish a connection with an access point in a network environment 100. The access point supports wireless communications over multiple carrier frequency bands 115.

In processing block 720, the connection manager 140 analyzes current load conditions associated with other mobile communication devices communicating with the access point over the multiple carrier frequency bands 115.

In processing block 730, the connection manager 140 selects a carrier frequency band from the multiple carrier frequency bands 115 based at least in part on the current load conditions.

In processing block 740, the connection manager notifies the mobile communication device 120-1 to connect to the access point 105-1 using the selected carrier frequency band.

Figure 8:
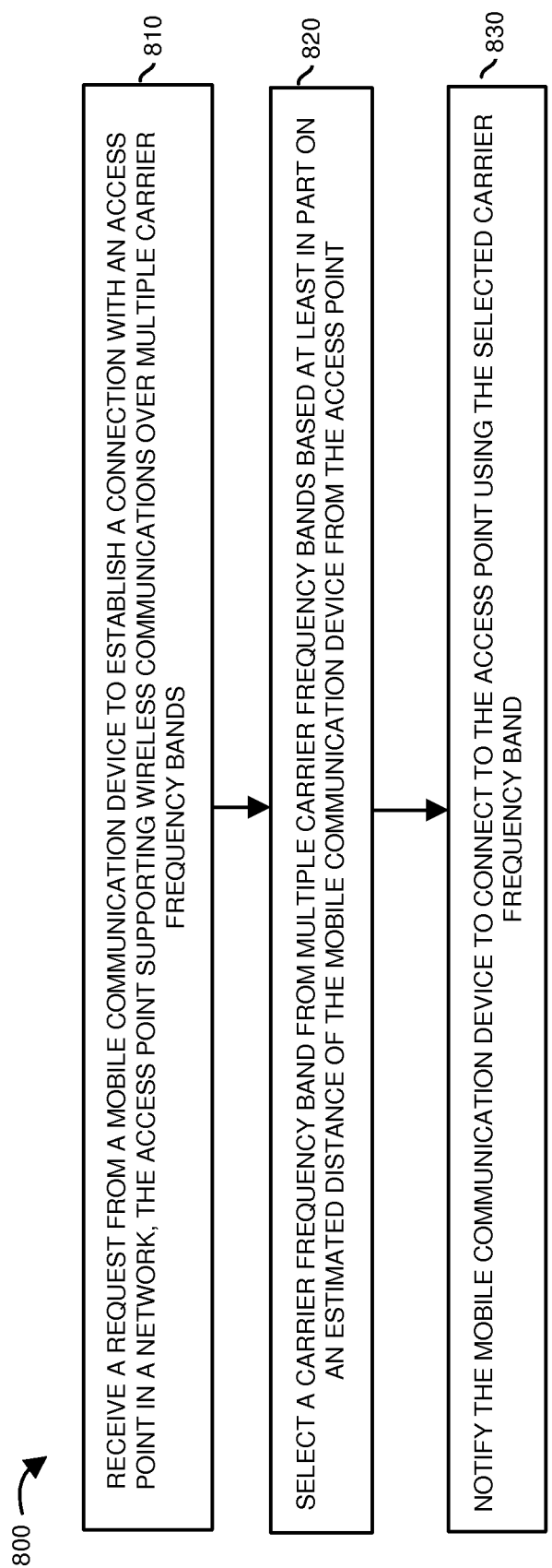

FIG. 8 is a flowchart 800 illustrating an example method according to embodiments. Note that there will be some overlap with respect to concepts as discussed above.

In processing block 810, the connection manager 140 receives a request 125 from a mobile communication device 120-1 to establish a connection with an access point 105-1 in network environment 100. The access point 105-1 supports wireless communications over multiple carrier frequency bands 115.

In processing block 820, the connection manager 140 selects an appropriate carrier frequency band from multiple carrier frequency bands 115 based at least in part on an estimated distance of the mobile communication device 120-1 from the access point 105-1.

In processing block 830, the connection manager 140 notifies the mobile communication device 120-1 to connect to the access point 105-1 using the selected carrier frequency band.

Note again that techniques herein are well suited for implementing load-balancing amongst multiple frequency bands and access points in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
via computer processor hardware, performing operations of:
receiving a request from a mobile communication device to establish a connection with an access point in a network, the access point supporting wireless communications over multiple carrier frequency bands, the mobile communication device generating the request;
analyzing current load conditions associated with other mobile communication devices communicating with the access point over the multiple carrier frequency bands;
selecting a carrier frequency band from the multiple carrier frequency bands based at least in part on the current load conditions; and
providing, in a wireless communication to the mobile communication device, a notification to the mobile communication device to connect to the access point using the selected carrier frequency band;
wherein the mobile communication device supports communications over each of the multiple carrier frequency bands, the multiple carrier frequency bands including a first carrier frequency band and a second carrier frequency band;
wherein the first carrier frequency band supports a first region of wireless communication coverage with respect to the access point, the second carrier frequency band supporting a second region of wireless coverage with respect to the access point, the second region of wireless coverage residing within and being substantially smaller than the first region of wireless coverage;
wherein the selected carrier frequency band is the second carrier frequency band, the method further comprising:
subsequent to communicating between the access point and the mobile communication device over the second carrier frequency band, detecting that a rate of movement of the mobile communication device is above a rate threshold value; and responsive to detecting that the rate of the movement is above the rate threshold value, notifying the mobile communication device to terminate communications with the access point using the second carrier frequency band and continue communications with the access point over the first carrier frequency band.

2. The method as in claim 1, wherein the mobile communication device supports communications over each of the multiple carrier frequency bands, the multiple carrier frequency bands including a first carrier frequency band and a second carrier frequency band; and wherein the first carrier frequency band supports substantially longer wireless communication distances between the access point and the mobile communication device than the second carrier frequency band.

3. The method as in claim 2, wherein selecting the carrier frequency band further comprises:

comparing a signal strength of receiving the request at the access point to a signal strength threshold value; and responsive to detecting that the received signal strength of the request at the access point is less than the signal strength threshold value, selecting the first carrier frequency band of the multiple carrier frequency bands for the mobile communication device to communicate with the access point.

4. The method as in claim 2 further comprising:

in response to detecting that data traffic between the access point and other mobile communication devices over the second carrier frequency band is below a threshold value and detecting that there is a sufficient bandwidth in the second carrier frequency band available for use by the mobile communication device, notifying the mobile communication device to connect to the access point using the second carrier frequency band.

5. The method as in claim 1 further comprising:

receiving the request at multiple access points in the network; and selecting the access point from the multiple access points.

6. The method as in claim 1 further comprising:

utilizing a round-trip time of communications between the access point and the mobile communication device to estimate a distance of the mobile communication device with respect to the access point; and selecting the carrier frequency band based at least in part on the estimated distance.

7. The method as in claim 1, wherein the selected carrier frequency band is the second carrier frequency band, the method further comprising:

subsequent to communicating between the access point and the mobile communication device over the second carrier frequency band, detecting movement of the mobile communication device outside the second region of wireless coverage into the first region of wireless coverage; and responsive to detecting the movement, notifying the mobile communication device to terminate communications with the access point using the second carrier frequency band and continue communications with the access point over the first carrier frequency band.

8. The method as in claim 7, wherein detecting the movement further comprises:

detecting a signal strength of communications received from the mobile communication device over the second carrier frequency band;

comparing the signal strength of the communications to a signal strength threshold value; and detecting that the signal strength of the communications is less than the signal strength threshold value.

9. The method as in claim 7, wherein detecting the movement further comprises:

detecting that the distance from the access point to the mobile communication device is greater than a distance threshold value.

10. The method as in claim 1, wherein detecting the movement further comprises:

communicating a beacon signal over the second carrier frequency band to the mobile communication device, the mobile communication device measuring a strength of receiving the beacon signal;

receiving a communication from the mobile communication device indicating a signal strength of the mobile communication device receiving the beacon signal;

comparing the signal strength to a signal strength threshold value; and detecting that the signal strength is less than the signal strength threshold value.

11. The method as in claim 1, wherein detecting the movement further comprises:

detecting that the distance of the mobile communication device from the access point falls below a distance threshold value.

12. The method as in claim 1, wherein the first carrier frequency band supports a first region of wireless communication coverage with respect to the access point, the second carrier frequency band supporting a second region of wireless coverage with respect to the access point, the second region of wireless coverage residing within and being substantially smaller than the first region of wireless coverage.

13. The method as in claim 12, wherein the selected carrier frequency band is the first carrier frequency band, the method further comprising:

selecting the first carrier frequency band for assignment to the communication device based at least in part on detecting that the communication device resides outside the second region of wireless coverage.

14. The method as in claim 12 further comprising:

from the access point, notifying the mobile communication device to terminate use of the second carrier frequency band; and wherein, as a response to the notifying the mobile communication device, the mobile communication device disassociates with the access point to terminate communications over the second carrier frequency band and reestablishes a respective wireless communication link with the access point using the first carrier frequency band.

15. The method as in claim 14, wherein the mobile communication device disassociates with the access point at a MAC layer and reestablishes a respective wireless communication link with the access point using the first carrier frequency band.

16. The method as in claim 1, wherein the selected carrier frequency band is a first carrier frequency band of the multiple carrier frequency bands, the method further comprising:

disassociating with the mobile communication device, the disassociating including termination of using a second carrier frequency band to communicate between the access point and the mobile communication device; and at the access point, re-establishing communications with the mobile communication device over the first carrier frequency band of the multiple carrier frequency bands.

17. The method as in claim 16, wherein disassociating with the mobile communication device includes disassociating with the mobile communication device only at a MAC layer and the second carrier frequency band when transitioning from use of the second carrier frequency band to use of the first carrier frequency band.

18. The method as in claim 17, wherein a user of the mobile communication device is unaware of a respective transition of the mobile communication device from using the second carrier frequency band to using the first carrier frequency band to communicate with the access point.

19. The method as in claim 1, wherein providing the notification to the mobile communication device to connect to the access point using the selected carrier frequency band includes:
   transmitting the wireless communication from the access point to the mobile communication device, the wireless message specifying the selected carrier frequency band to be used by the mobile communication device to establish the connection.

20. The method as in claim 19 further comprising:
   establishing the connection between the mobile communication device and the access point using the selected carrier frequency band.

21. The method as in claim 19 further comprising:
   performing the selection of the carrier frequency band at an access point connection manager that controls the access point, the access point connection manager disparately located with respect to the mobile communication device.

22. The method as in claim 21, wherein the access point connection manager is operable to perform selection of the carrier frequency band based at least in part on a signal strength of a wireless signal received from the mobile communication device at the access point.

23. The method as in claim 1 further comprising:
   from the access point, transmitting a first beacon communication in a first carrier frequency band to notify the mobile communication device that the access point supports communications over the first carrier frequency band; and
   from the access point, transmitting a second beacon communication in a second carrier frequency band to notify the mobile communication device that the access point supports communications over the second carrier frequency band.

24. The method as in claim 1, wherein the multiple carrier frequency bands includes a first carrier frequency band and a second carrier frequency band; and
   wherein receiving the request includes: i) receiving a first wireless communication from the mobile communication device, the first wireless communication transmitted from the mobile communication device over the first carrier frequency band, and ii) receiving a second wireless communication from the mobile communication device, the second wireless communication transmitted from the mobile communication device over the second carrier frequency band.

25. The method as in claim 24, wherein the first carrier frequency band supports a first region of wireless coverage with respect to the access point, the second carrier frequency band supporting a second region of wireless coverage with respect to the access point, the second region of wireless coverage residing within and smaller than the first region of wireless coverage.

* * * * *